United States Patent

Chung

[11] Patent Number: 5,806,441
[45] Date of Patent: Sep. 15, 1998

[54] AUTOMATIC CARBON BLACK DISCHARGING DEVICE IN WASTE TIRE DECOMPOSING APPARATUS

[76] Inventor: Yong-jae Chung, 1-75 Sambu Apt. 30-3, Youido-dong, Yongdungp'o-gu, Seoul, Rep. of Korea

[21] Appl. No.: 597,401

[22] Filed: Feb. 8, 1996

[51] Int. Cl.⁶ .............................. F23N 5/18; F23N 1/00
[52] U.S. Cl. .................... 110/185; 110/186; 110/108; 110/110; 110/219; 110/220; 110/222; 110/255; 110/267; 110/293; 110/327; 222/63; 222/64; 318/482
[58] Field of Search ..................... 110/185, 186, 110/108, 110, 255, 286, 292, 293, 327, 218, 219, 220, 222, 223, 232, 257, 267; 318/482; 222/63, 64

[56] References Cited

U.S. PATENT DOCUMENTS

| | | | |
|---|---|---|---|
| 2,585,607 | 2/1952 | Whitmore et al. | 65/335 |
| 3,266,874 | 8/1966 | Alleman | 23/314 |
| 3,865,053 | 2/1975 | Kolze et al. | 110/186 |
| 4,071,168 | 1/1978 | Stone | 222/56 |
| 4,528,917 | 7/1985 | Jacobs | 110/300 |
| 4,531,462 | 7/1985 | Payne | 110/210 |
| 4,667,852 | 5/1987 | Siemann | 222/54 |
| 4,762,073 | 8/1988 | Giaier et al. | 110/101 CD |
| 5,411,714 | 5/1995 | Wu et al. | 422/232 |
| 5,473,234 | 12/1995 | Richardson | 318/497 |
| 5,611,290 | 3/1997 | Tratz et al. | 110/222 |
| 5,634,414 | 6/1997 | Camacho | 110/346 |
| 5,680,821 | 10/1997 | Wright et al. | 110/257 |

FOREIGN PATENT DOCUMENTS 4-180881 6/1992 Japan .
570883 9/1977 U.S.S.R. .

*Primary Examiner*—Carl D. Price
*Assistant Examiner*—Ljiljana V. Ciric
*Attorney, Agent, or Firm*—Birch, Stewart, Kolasch & Birch, LLP

[57] ABSTRACT

An automatic carbon black discharging device for a waste tire decomposing apparatus including a collecting hopper connected to a carbon black discharging portion of the waste tire decomposing apparatus. The automatic carbon black discharging device also includes a plurality of sensors respectively disposed at vertically equidistantly divided positions of the collecting hopper and adapted to sense maximum, normal and minimum levels of carbon black collected in the collecting hopper, thereby stopping or driving a drive motor for driving a feeding screw included in the waste tire decomposing apparatus. The carbon black is left in the collecting hopper in a minimum amount provide a sealing effect which prevents external air from entering into the device. When the amount of carbon black collected in the collecting hopper corresponds to the maximum level of the collecting hopper, the driving motor is controlled to increase its rotating speed, thereby increasing the discharge rate of carbon black.

6 Claims, 3 Drawing Sheets

AUTOMATIC CARBON BLACK DISCHARGING DEVICE IN WASTE TIRE DECOMPOSING APPARATUS

BACKGROUND OF THE INVENTION

1. Field of the Invention

The present invention relates to a waste tire decomposing apparatus including a pulverizing unit for pulverizing waste tires and a thermal decomposing unit for decomposing pieces of the pulverized waste tires, thereby obtaining particles of carbon black, and more particularly to an automatic carbon black discharging device. The waste tire decomposing apparatus includes not only a collecting hopper disposed at the discharge portion of the waste tire decomposing apparatus to collect carbon black while controlling the discharge amount and rate of carbon black, but also a carbon black amount checking sensor provided at the collecting hopper. The apparatus controls the rotating speed of a drive motor for driving a feeding screw in accordance with an output signal from the sensor while providing an improved sealing effect.

1. Description of the Prior Art

Although it is well known that waste tires involve various pollution related problems, they are reusable only in very limited fields after being pulverized or decomposed. Furthermore, known methods for decomposing such waste tires are ineffective.

To date, reuse of waste tires has been limited only to manufacture of secondary articles using waste tire pieces obtained after cutting waste tires. Due to a continuously increased amount of such waste tires which are industrial waste, advanced nations have invested enormous amounts of money to the development of techniques for reuse of the waste tires.

By virtue of such a technical development, new technical fields, in which waste tires or elements thereof are usable, have been continuously found. New pulverizing or decomposing methods have also been developed. One example of such techniques is illustrated in FIG. 3.

FIG. 3 shows a device wherein waste tires are pulverized into pieces of a certain size and then decomposed to obtain carbon black free of steel wires originally buried in the waste tires. After pulverizing waste tires into pieces having a length of about 10 cm, they are decomposed by a thermal decomposing unit 120, as shown in FIG. 3. The decomposed material, which is in a highly heated state due to heat generated during the pulverizing and decomposing works, for example, at a temperature of about 250° C., is fed from the thermal decomposing unit 120 to a primary feeding unit 130 while being cooled to a temperature of about 50° C. by a cooling unit 131 provided at the primary feeding unit 130. From the primary feeding unit 130, the material is fed to a separating unit 140 which, in turn, separates the material into carbon black and steel wires and feeds the steel wires to a water vessel 141 for their reuse. On the other hand, the carbon black is discharged through a secondary feeding unit 150.

The units of the above-mentioned device, in particular, the thermal decomposing unit 120 can obtain an enhanced working effect in a sealed space. In such a device, however, air is introduced in the device through its discharge port, thereby resulting in a degradation in workability or decomposition. In order to solve this problem, the secondary feeding unit 150 has a discharge screw 151 provided with a blade-free portion at a desired area thereof while being provided with feeding blades 152 at the remaining area thereof. Once carbon black 200 being fed by feeding blades 152 in the discharge screw 151 reaches the blade-free portion of the discharge screw 151, it is not discharged from the blade-free portion until the blade-free portion is completely filled with the fed carbon black. Accordingly the carbon black body filling the blade-free portion of the discharge screw 151 seals the space defined in a feeding tube which surrounds the discharge screw 151, thereby preventing air from being introduced in the overall device.

Since the carbon black body 200 formed in the feeding tube has many gaps because it consists of fine particles being very light and having a low compactness, air is introduced in the device through the gaps. As a result, the device involves degradation in workability or decomposition due to the introduced air. This results in problems in the practical use of the device.

SUMMARY OF THE INVENTION

Therefore, an object of the invention is to provide an automatic carbon black discharging device in a waste tire decomposing apparatus including a collecting hopper connected to a carbon black discharging portion of the apparatus and constructed to be capable of leaving an appropriate amount of carbon black therein so that the carbon black can seal gaps defined by particles thereof by its weight.

In order to always leave an appropriate amount of carbon black in the collecting hopper, it is required to control the discharge amount and rate of carbon black from the waste tire decomposing apparatus.

For example, when the decomposing unit is supplied with the raw material in an amount more than the discharge amount of carbon black, the amount of carbon black supplied in the collecting hopper exceeds the capacity of the collecting hopper, thereby causing the carbon black to overflow the collecting hopper. In this case, the screw conveyor may be damaged due to the excessive weight of the carbon black collected in the collecting hopper.

On the other hand, where the decomposing unit is supplied with the raw material in an amount less than the discharge amount of carbon black, the amount of carbon black supplied in the collecting hopper may be too small to prevent air from being introduced in the apparatus through gaps defined among fine particles of the carbon black. The introduced air may reach the thermal decomposing chamber, which should be maintained in a sealed state, thereby degrading the decomposing operation of the decomposing apparatus.

In order to solve these problems, the difference in carbon black amount between the decomposing unit and discharging unit should be adjusted. This may be accomplished by simply reducing the supply amount of the raw material or stopping the supply of the raw material when the discharge amount of carbon black is too large while increasing the supply amount of the raw material or stopping the discharge of the carbon black when the discharge amount of the carbon black is too small. However, this method cannot be applied to automatic waste tire pulverizing devices because it is manually carried out.

To solve this problem, the present invention provides an automatic carbon black discharging device including a collecting hopper connected to the carbon black discharging portion of the waste tire decomposing apparatus. The automatic carbon black discharging device also includes a plurality of sensors respectively disposed at vertically equidistantly divided positions of the collecting hopper and adapted to sense maximum, normal and minimum levels of carbon black collected in the collecting hopper, thereby stopping or driving the drive motor for the feeding screw.

When the amount of carbon black collected in the collecting hopper corresponds to the minimum level of the collecting hopper, the drive motor is stopped in accordance with a control signal generated from the minimum level sensor, thereby stopping the discharge of carbon black. Accordingly, the carbon black can be always left in the collecting hopper in a minimum amount capable of providing a sealing effect. When the amount of carbon black collected in the collecting hopper corresponds to the maximum level of the collecting hopper, the driving motor is controlled to increase its rotating speed, thereby increasing the discharge rate of carbon black.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
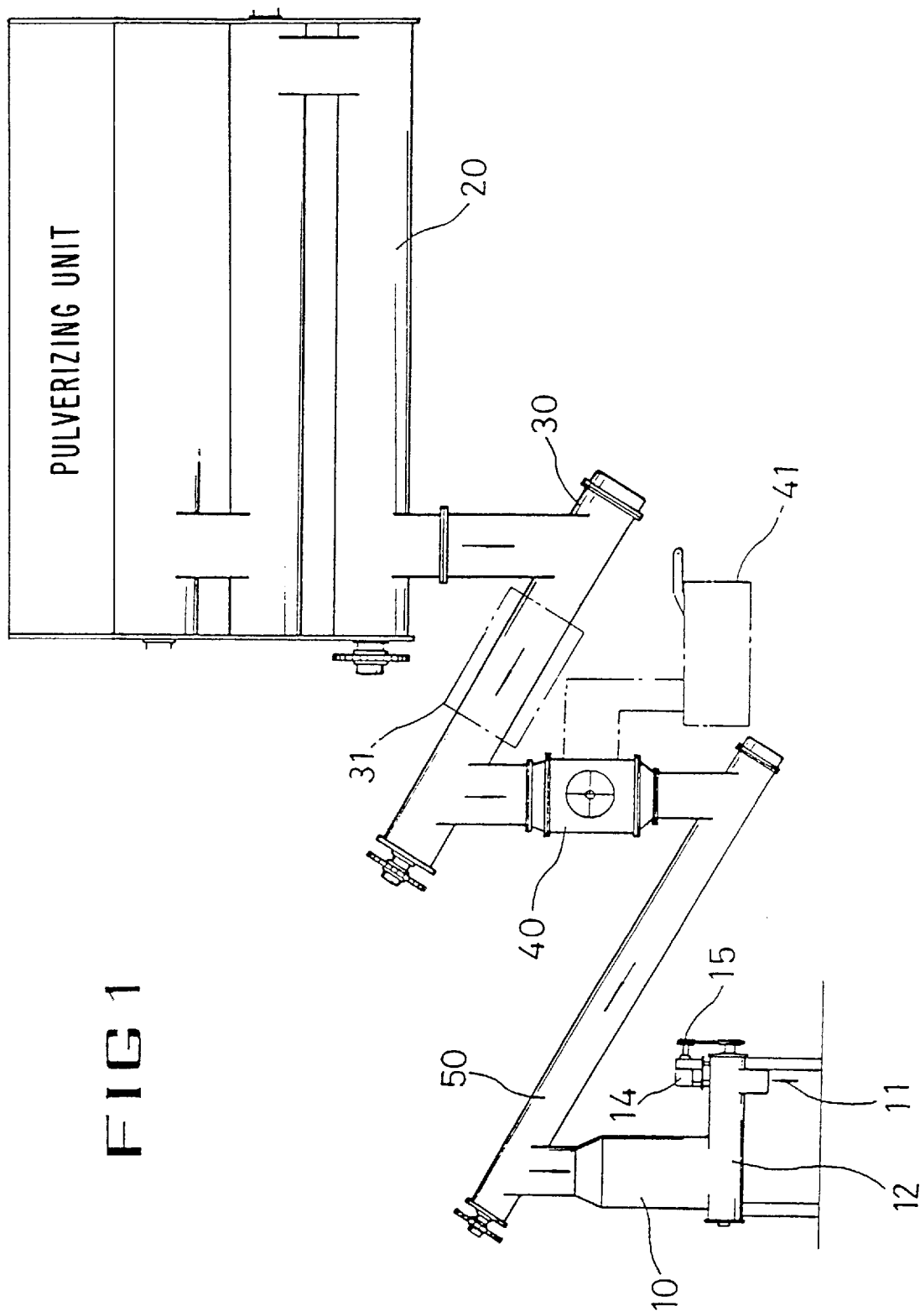
FIG. 1 is a schematic view illustrating an automatic carbon black discharging device in a waste tire decomposing apparatus according to the present invention.

FIG. 1 is a schematic view illustrating an automatic carbon black discharging device in a waste tire decomposing apparatus according to the present invention. On the other hand, FIG. 2 is a sectional view of a hopper included in the automatic carbon black discharging device according to the present invention.

Figure 2:
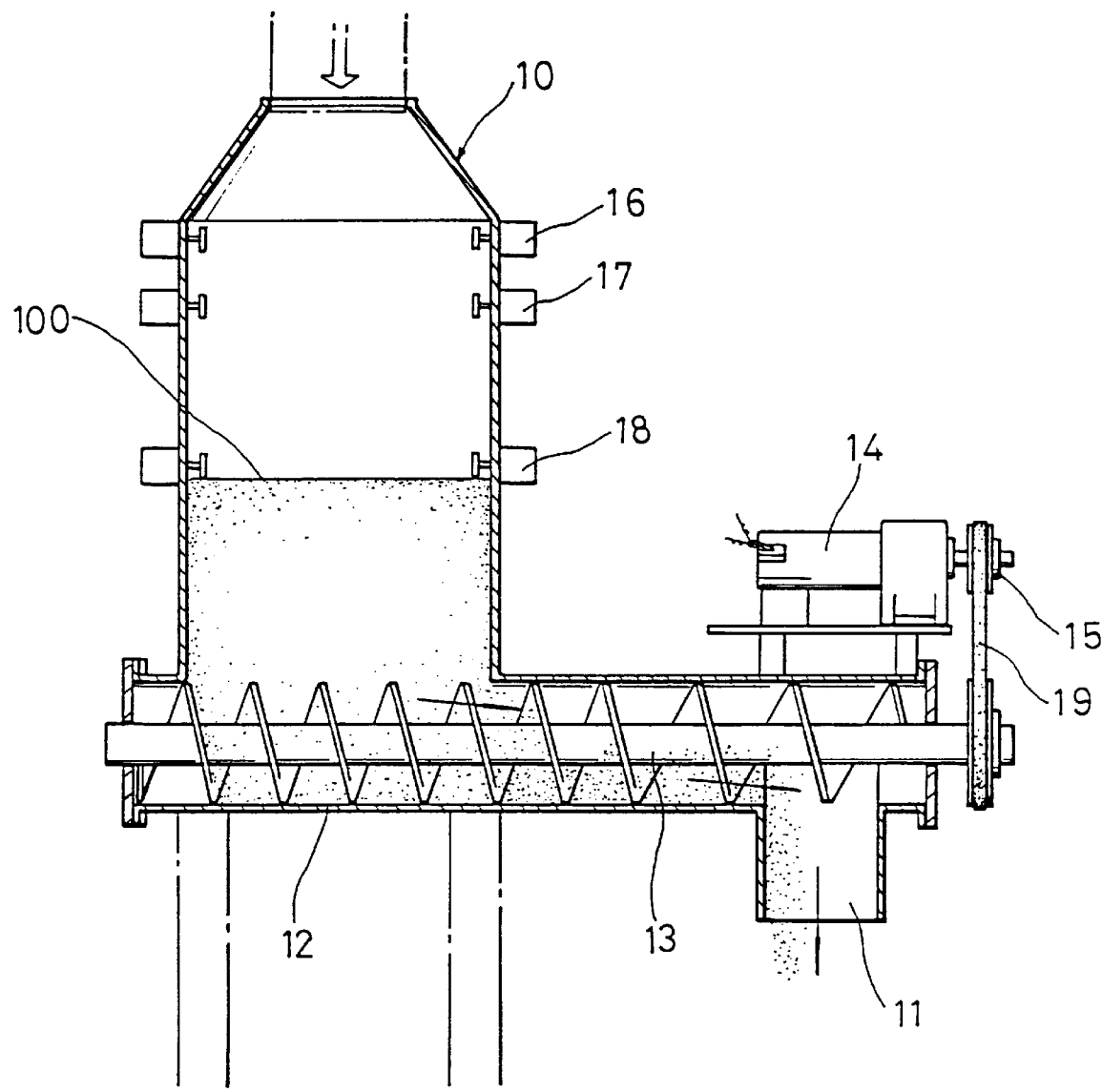
FIG. 2 is a sectional view of a hopper included in the automatic carbon black discharging device according to the present invention.
Figure 3:
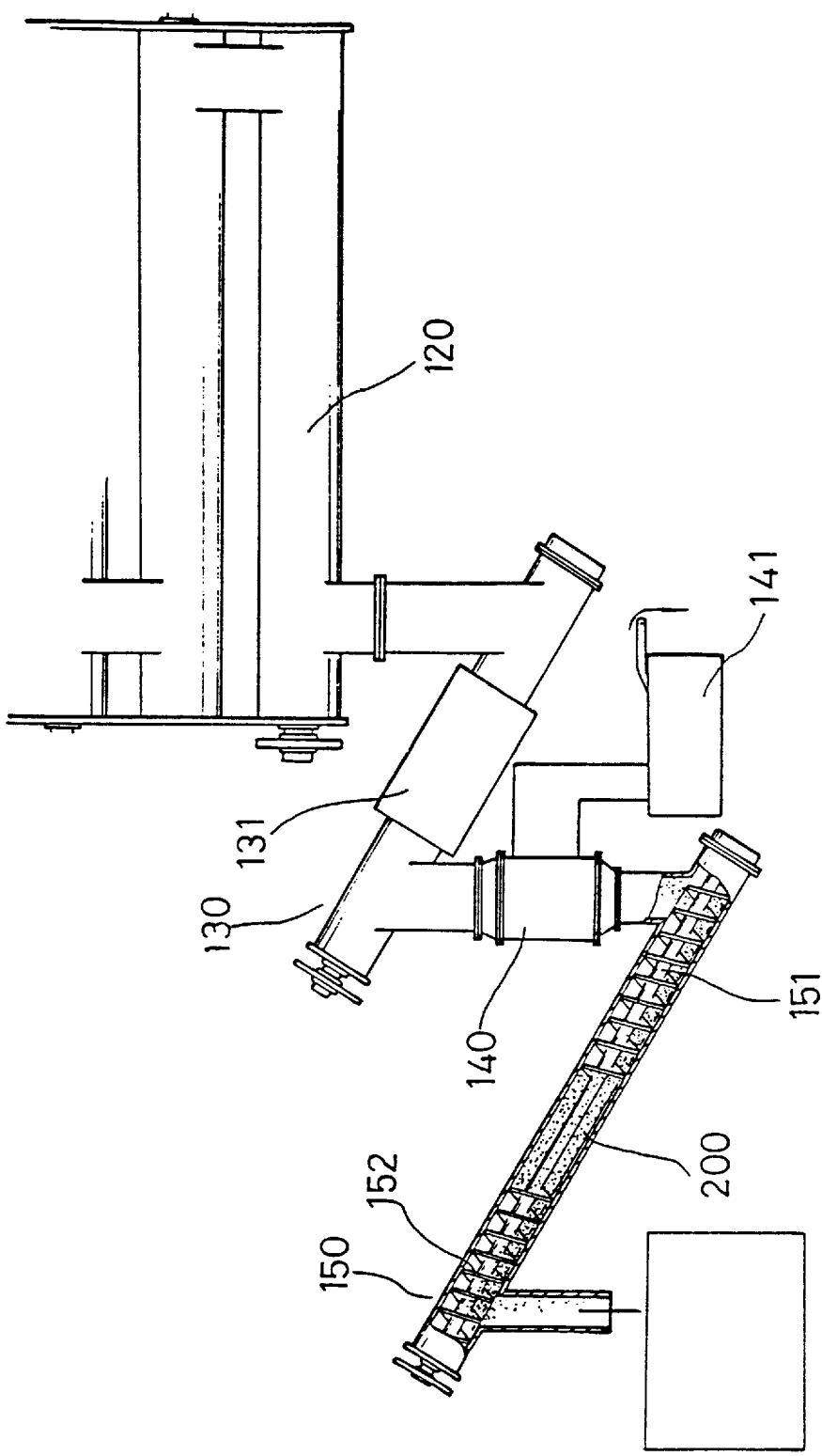
FIG. 3 is a schematic view illustrating a conventional waste tire decomposing apparatus.

As shown in FIGS. 1 and 2, the waste tire decomposing apparatus includes a pulverizing unit which serves to pulverize a raw material, which may be waste tires, supplied to the apparatus in pieces of a certain size. The pulverized raw material is decomposed in a thermal decomposing unit 20 to produce carbon black and then fed to separating unit 40 by a primary feeding unit 30 while being cooled by a cooling unit 31 provided at the primary feeding unit 30.

In the separating unit 40, metal wires are separated from the carbon black 100. The metal wires are then fed to a water vessel 41 while being shielded from outside air so that they can be reused. On the other hand, the carbon black 100 is poured into a collecting hopper 10 by a secondary feeding unit 50.

In accordance with the present invention, the collecting hopper 10 is disposed at the upper portion of a feeding tube 12 which has a discharge port 11, as shown in FIG. 2. In the feeding tube 12, a feeding screw 13 is axially disposed, which is operatively coupled to a drive pulley 15 mounted to a drive motor 14 by means of a belt 19.

Maximum, normal and minimum level sensors 16, 17 and 18 are disposed at vertically equidistantly divided positions of the collecting hopper 10, respectively. These sensors serve to control the drive motor 14 in accordance with the amount of carbon black contained in the collecting hopper 10.

Operation of the automatic carbon black discharging device having the above-mentioned construction will now be described.

After waste tires are supplied in the pulverizing unit, they are pulverized into pieces having a size of about 10 cm. The pulverized pieces are then decomposed while passing through the thermal decomposing unit 20, thereby producing carbon black powder including metal wires originally buried in the waste tires. The material is then fed to the primary feeding unit 30.

Since the primary feeding unit 30 is provided with the cooling unit 31, the material is cooled to a temperature of about 50° C. while being fed by the primary feeding unit 30. The cooled material is then fed to the separating unit 40.

The separating unit 40 separates the metal wires from the fed material and feeds the separated metal wires to the water vessel 41. The metal wires are subsequently fed to the outside while being shielded from air.

The carbon black 100, which is free of metal wires as mentioned above, is collected in the collecting hopper 10 as it is fed to the collecting hopper 10 by the secondary feeding unit 50. The carbon black 100 collected in the collecting hopper 10 is then fed to the feeding screw 13 so that it can be outwardly discharged.

Although the overall operation of the above-mentioned apparatus should be carried out in a sealed space, air is introduced in the apparatus through the discharge port 11 when the amount of carbon black collected in the collecting hopper 10 is reduced below a predetermined amount (the predetermined amount being an amount where the carbon black seals gaps defined in particles thereof to prevent the flow of air). The introduced air passes through the collecting hopper 10 along gaps defined among particles of the carbon black, so that it may enter each unit of the apparatus, thereby interfering with the decomposing function of the unit.

In accordance with the present invention, the minimum level of the carbon black 100 collected in the collecting hopper 10 is set in order to leave the carbon black 100 at a predetermined amount or above in the collecting hopper 10. The minimum level sensor 18 is positioned at a position of the collecting hopper 10 corresponding to the minimum carbon black level.

For example, where the carbon black 100 collected in the collecting hopper 10 has a weight of about 230 kg, it is in a compact state without forming any air introduction space by virtue of its weight even though it is in a powder form. In this case, the carbon black 100 provides an effect of sealing the discharge port 11.

In accordance with the present invention, the maximum level of the carbon black 100 collected in the collecting hopper 10 is also set. The maximum level sensor 16 is positioned at a position of the collecting hopper 10 corresponding to the maximum carbon black level. When the maximum level sensor 16 senses the maximum amount of carbon black collected in the collecting hopper 10, it serves to increase the rotating speed of the drive motor 14 for the feeding screw 13, thereby increasing the discharge rate of the carbon black. With such a construction, it is possible to prevent the collected carbon black from overflowing the collecting hopper 10. Between the minimum and maximum carbon black levels, a normal level of the carbon black 100 collected in the collecting hopper 10 is also set in order to discharge a normal amount of carbon black. The normal level sensor 17 is positioned at a position of the collecting hopper 10 corresponding to the normal carbon black level.

Preferably, each of the sensors is a level switch.

The level switch has a rotating blade which stops rotating when it comes into contact with the carbon black 100 collected in the collecting hopper 10. As the rotating blade of the level switch stops its rotation, microswitch contacts included in the level switch are opened, so that the level switch generates a signal for driving or stopping the drive motor 14 which is a variable speed motor. In such a manner, the drive motor 14 adjusts its rotating speed or stops.

In accordance with a preferred embodiment of the present invention, when the normal level sensor 17 comes into contact with the carbon black collected in the collecting hopper 10 as the amount of the carbon black increases, thereby causing its rotating blade to stop, its contacts are opened, so that the sensor 17 sends a primary control signal to a control unit (not shown) which, in turn, sends a primary drive signal to the drive motor 14. In accordance with the primary drive signal, the drive motor 14 is driven.

In this case, accordingly, the feeding screw 13 operatively coupled to the drive motor 14 via the pulley belt 19 rotates, thereby causing the carbon black 100 to be discharged from the bottom portion of the collecting hopper 10 to the discharge port 11 via the feeding tube 12.

Where the amount of carbon black supplied in the collecting hopper 10 increases over the normal amount while its supply rate is larger than the discharge rate, the level of the carbon black in the collecting hopper 10 increases and reaches the maximum level sensor 16, thereby causing the rotating blade of the sensor 16 to stop.

At this time, the maximum level sensor 16 sends a secondary signal to the control unit which, in turn, sends a secondary drive signal to the drive motor 14. In accordance with the secondary drive signal, the drive motor 14 increases its rotating speed from a range of 500 to 600 rpm to a range of 1,000 to 1,200 rpm.

As a result, the feeding screw 13, which is operatively connected to the drive motor 14, increases its rotation speed, thereby increasing the feeding rate of the carbon black 100. In such a manner, the discharge rate of carbon black increases.

Where the amount of carbon black supplied in the collecting hopper 10 is reduced to the minimum level, thereby causing the rotating blade of the minimum level sensor 18 to rotate, the sensor 18 generates a control signal for stopping the drive motor 14. In this case, a further discharge of carbon black is prevented.

Thus, the amount of carbon black remaining in the collecting hopper 10 is always maintained in an appropriate level. Accordingly, it is possible to always obtain the effect of preventing air from entering the apparatus.

As apparent from the above description, the present invention provides an automatic carbon black discharging device in a waste tire decomposing apparatus capable of leaving an appropriate amount of carbon black in its collecting hopper to provide a decomposition environment enabling the decomposition of waste tires to be carried out in a sealed space, and controlling the discharge rate of the carbon black in accordance with the supply rate thereof, thereby efficiently reusing the waste tires.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A waste decomposing apparatus comprising:

a pulverizing unit which pulverizes waste tires into waste tire pieces having a size smaller than the waste tires;

a thermal decomposing unit which communicates with said pulverizing unit and which receives the waste tire pieces, said thermal decomposing unit decomposes the waste tire pieces into a carbon black mixture and moves the carbon black mixture away from said pulverizing unit;

a primary feeding unit disposed at a first angle relative to said thermal decomposing unit and communicates with said thermal decomposing unit for receiving the carbon black mixture, said primary feeding unit includes a cooling unit which cools the carbon black mixture while said primary feeding unit moves the carbon black material away from said thermal decomposing unit;

a separating unit communicates with said primary feeding unit for receiving the carbon black mixture, said separating unit separates the carbon black mixture into carbon black and metal wires, said separating unit feeds the metal wires into a water vessel while said separating unit moves the carbon black away from said primary feeding unit;

a secondary feeding unit disposed at a second angle relative to said thermal decomposing unit, said first angle is substantially equal to said second angle, said secondary feeding unit communicates with said separating unit for receiving the carbon black, said secondary feeding unit moves the carbon black away from said separating unit;

a collecting hopper communicates with said secondary feeding unit for receiving the carbon black, said collecting hopper includes a feed tube which has a feed screw disposed axially therein, said feed screw connects operatively to a variable speed motor device, said feed tube is substantially parallel to said thermal decomposing unit and moves said carbon black away from said secondary feeding unit and said collecting hopper;

a plurality of sensors disposed at first, second, and third positions in said collecting hopper to sense at least one of predetermined maximum, normal, and minimum levels of the carbon black, said sensors generate control signals which drive said motor device at speeds which correspond to the at least one predetermined maximum, normal, and minimum levels of carbon black in said collecting hopper, said sensors and said motor device with said feed screw maintain the carbon black at one of the predetermined levels to substantially reduce air from entering a discharge port of said feed tube, whereby the decomposing efficiency of said thermal decomposing unit is substantially increased.

2. The waste decomposing unit of claim 1, wherein said primary and said secondary feeding units include feed screws for moving at least one of the carbon black mixture and the carbon black.

3. The waste decomposing unit of claim 1, wherein each of said sensors includes a level switch.

4. The waste decomposing unit of claim 3, wherein each of said sensors includes a rotating blade which rotates when said blade is out of contact with the carbon black and stops when said blade contacts the carbon black.

5. The waste decomposing unit of claim 1, wherein said feed tube of said collecting hopper moves said carbon black in a direction substantially opposite to said thermal decomposing unit.

6. The waste decomposing unit of claim 1, wherein said first sensor when activated generates a primary control signal to drive said motor device at a first speed, said second sensor when activated generates a secondary control signal to drive said motor device at a second speed, said first speed is greater than said second speed, and said third sensor when activated generates a third control signal to stop said motor device.

* * * * *